June 20, 1961 L. R. KAHN 2,989,707

COMPATIBLE SINGLE SIDEBAND RADIO TRANSMISSION SYSTEM

Filed Sept. 26, 1956 3 Sheets-Sheet 1

INVENTOR.
Leonard R. Kahn.
BY
Harness, Dickey & Pierce.
ATTORNEYS.

COMPATIBLE SINGLE SIDEBAND RADIO TRANSMISSION SYSTEM

Filed Sept. 26, 1956 3 Sheets-Sheet 2

INVENTOR.
Leonard R. Kahn
BY
Darness, Dickey & Pierce,
ATTORNEYS.

June 20, 1961 L. R. KAHN 2,989,707

COMPATIBLE SINGLE SIDEBAND RADIO TRANSMISSION SYSTEM

Filed Sept. 26, 1956 3 Sheets-Sheet 3

INVENTOR.
Leonard R. Kahn
BY
Darness, Dickey & Pierce
ATTORNEYS.

United States Patent Office 2,989,707

Patented June 20, 1961

2,989,707

COMPATIBLE SINGLE SIDEBAND RADIO TRANSMISSION SYSTEM

Leonard R. Kahn, 81 S. Bergen Place, Freeport, N.Y.

Filed Sept. 26, 1956, Ser. No. 612,239

30 Claims. (Cl. 332—45)

This invention relates to radio transmission systems, and more particularly to single sideband radio transmitters.

Since each of the two sidebands produced in the amplitude modulation of a carrier by an audio-frequency signal contains all of the audio-frequency intelligence, the width of the radio-frequency band required for the transmission of the complete audio information may be quite appreciably reduced if but one of the sidebands is transmitted. It has been recognized that among the additional advantages attendant single sideband transmission are the reduction in the power required in transmission, and the appreciably enhanced signal-to-noise ratio.

Single sideband transmission has been practicable only where the receiving instruments are specifically designed for such reception. If a normally modulated single sideband wave is received by the double sideband broadcast receivers in common use, the resulting audio output signal is so distorted as to substantially degrade intelligibility. For example, if the carrier is 100% modulated, demodulation of the incoming single sideband signal by a conventional receiver will result in an audio signal having approximately 25% harmonic distortion. While the distortion may be reduced to an acceptable level by reducing the index of modulation, the cost of such reduction is the loss of many of the advantages of single sideband transmission, for the signal-to-noise ratio falls with reduced modulation and the power output is reduced by the square of the reduction in the index of modulation. Consequently, prior attempts to employ single sideband transmission for reception by conventional double sideband receivers, that is, prior attempts to radiate a compatible single sideband wave, have not proved commercially successful.

In a previous investigation by the present inventor, a single sideband transmitter was devised which possessed certain advantages, primarily in the directions of equipment simplification and cost reduction, and the results of that work are disclosed in Patent No. 2,666,133, granted January 12, 1954. It is intended to incorporate that disclosure herein by reference. The improvement was predicated upon a recognition that a single sideband wave contains both amplitude modulation and phase modulation components. In that system, the phase-modulated and amplitude-modulated components were separated (to facilitate amplification) and recombined in a manner to reproduce, as closely as possible, the original single sideband wave. As a result, the output signal is incompatible to the same degree as that of conventional single sideband transmitters.

The present system is compatible from the standpoint that its output wave, while containing primarily but the carrier and single sideband frequencies, will, upon detection in a conventional double sideband receiver, produce an audio signal very closely approximating the wave form of the original audio input at the transmitter. Compatibility is achieved, in the preferred system, essentially by amplitude modulating the phase-modulated component of a single sideband carrier wave with the fundamental of the amplitude modulated component. The carrier may be either full or reduced, and the expression single sideband and carrier is intended to be generic to both.

In both the system disclosed in the noted patent and in the herein disclosed preferred arrangement, the output of a single sideband generator is, in effect, resolved into its phase-modulated and amplitude-modulated components, the latter of which includes generator-induced (and more particularly filter-induced) overtones not present in the original audio input to the generator. In the patented system, the phase-modulated component is amplitude-modulated with the full amplitude-modulated component, producing, as taught in the patent, an output wave form closely approximating that of the single sideband generator. Conversely, in the present preferred arrangement, the remodulation is with effectively only the fundamental of the amplitude-modulated component of the generator output signal, that is, the wave form of the modulating signal is very similar to that of the input audio signal. The present system may therefore be characterized as one for producing an output signal including the phase-modulated component of a single sideband wave and an envelope having substantially the same spectrum components as the input audio wave.

In addition to the above-noted advantages of single sideband transmission, it has been found that the transmission of a compatible single sideband signal, under the precepts of the present invention, results in a reduction in selective fading distortion, permitting an increase in the broadcasting source area, a reduction in co-channel interference, improved fidelity for conventional narrow IF receivers, and the opportunity to improve the signal-to-noise ratio in the design of new receivers by reduction in the band width of the intermediate-frequency amplifiers in such receivers.

In general, the principles of the invention are representatively embodied in the preferred form, in a transmitting system including a single sideband and carrier generator, means for deriving an amplified phase-modulated component from the generator output, means for deriving the fundamental of the amplitude-modulated component from the generator output signal, and means for combining those constituents into a system output signal. In the shown arrangement, a full or reduced carrier single sideband wave is generated by feeding the input audio signal and a carrier into a suppressed-carrier balanced modulator, filtering out the undesired sideband, and adding the carrier to the selected sideband.

A portion of this signal is limited and amplified, by amplifiers which need not be linear, eliminating the amplitude-modulated component and isolating the phase-modulated component of the single sideband and carrier wave. Another portion of the generator output signal is applied to the aforesaid means for deriving the fundamental of the amplitude-modulated component from that signal, and one form of that class of demodulators known as product or heterodyne demodulators is representatively disclosed as one suitable such means. That demodulator serves to combine, and, in effect, to multiply, the single sideband and carrier wave with additionally introduced carrier, producing an audio-frequency output. That output is amplified and utilized to modulate the derived and isolated phase-modulated component. Appropriate means are provided to coordinate the amplitudes and phases of the signals in the system.

Other means are described for accomplishing the same function without isolation of the phase-modulated component.

While the basic system has proved to operate successfully, a number of instrumentalities are contemplated for improving its performance, including, as disclosed, means for modifying either the output signal, the demodulated amplitude-modulated component or the isolated phase-modulated component to reduce the spurious content of the ultimate output signal. Means are also disclosed for applying the invention to dual-channel use.

The principles of the invention may be more fully comprehended from the following detailed descriptions of embodiments of the invention when read with reference to the accompanying drawings in which FIGURE 1 is a block diagram of a system embodying the principles of the invention and includes selectively operable means for converting to pure single sideband operation;

Figure 1:
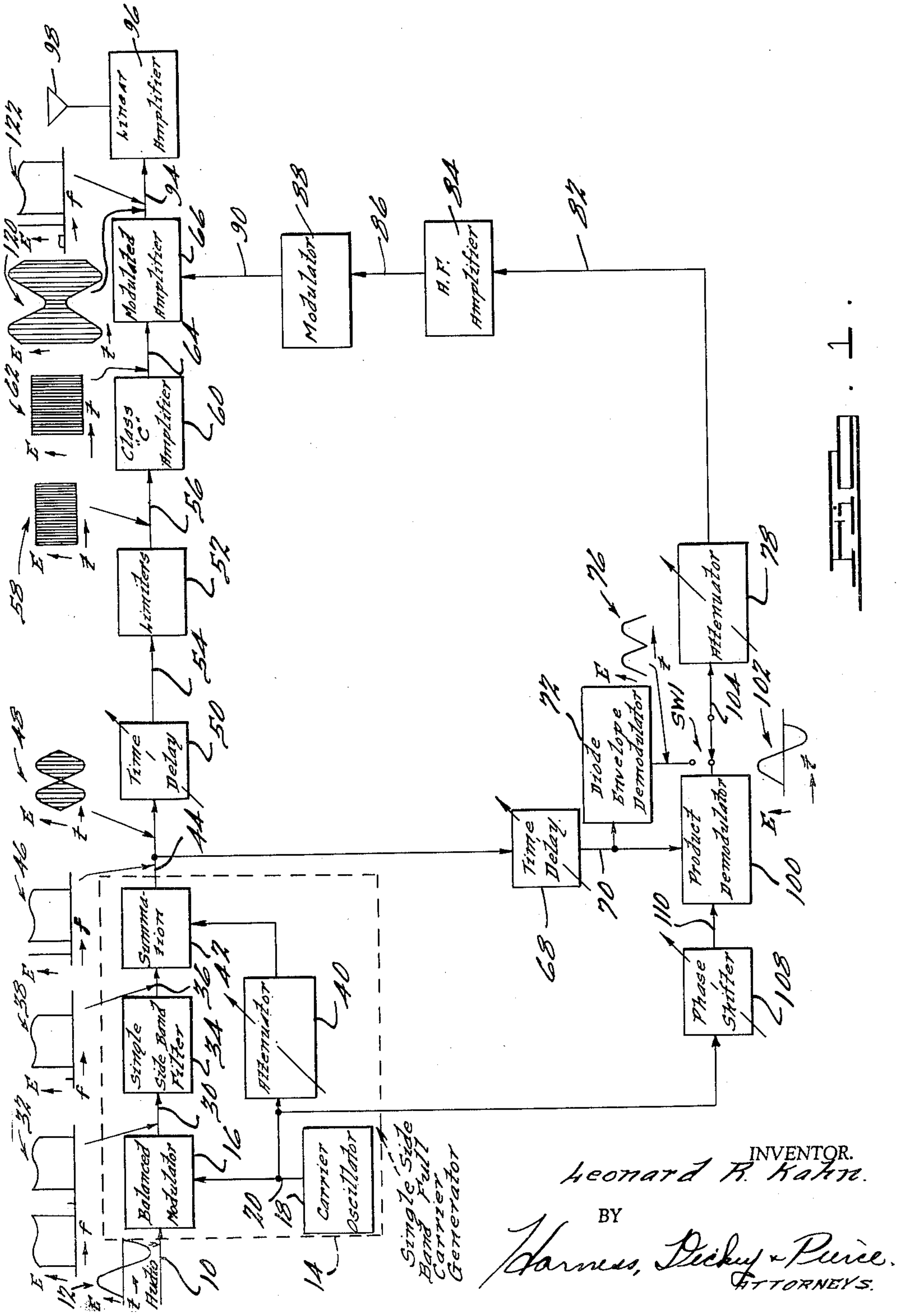
Figure 2:
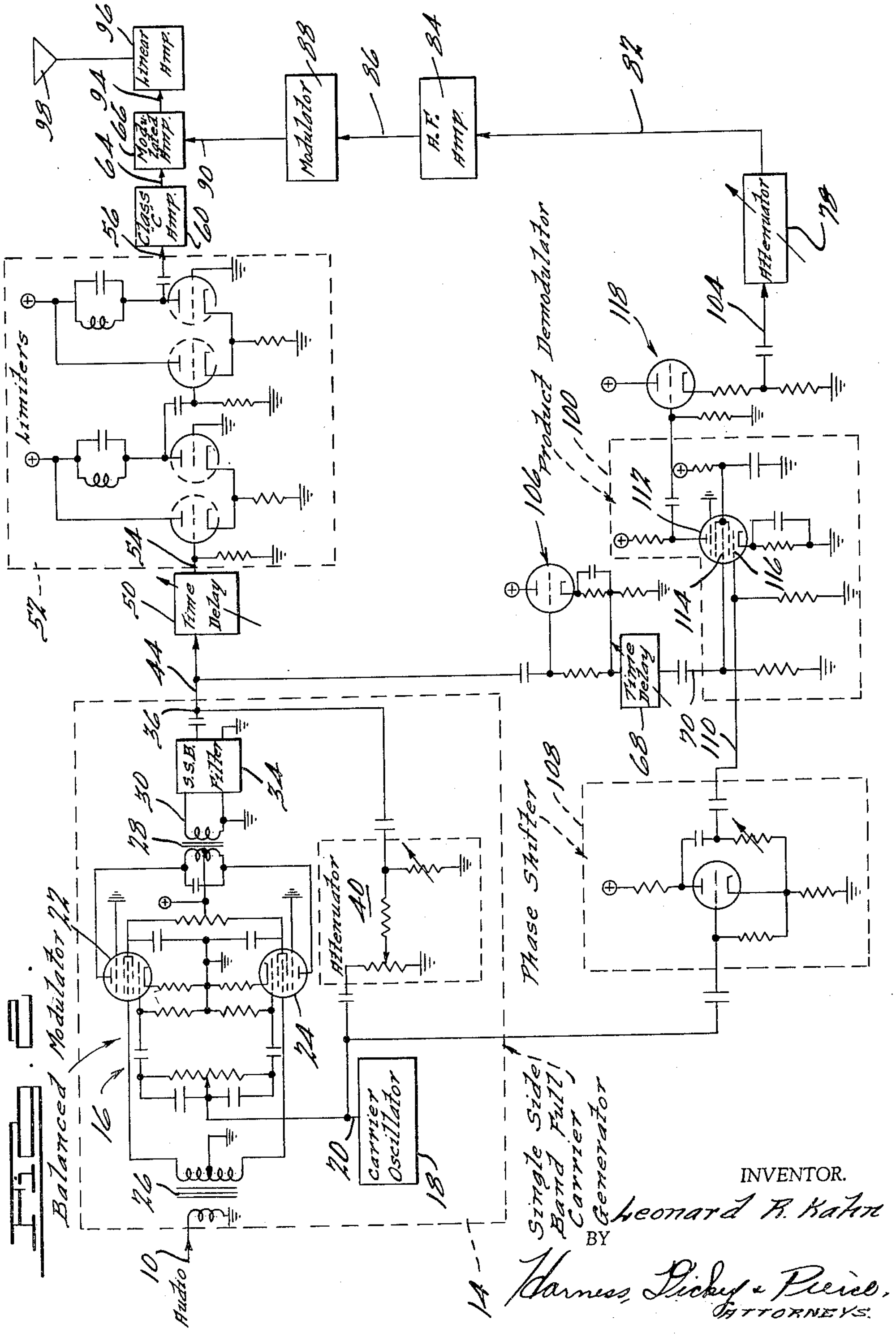
FIG. 2 is a view illustrating details of suitable circuitry which may be employed to fulfill certain of the functions denoted in the representation of FIG. 1.

In the system represented in FIGS. 1 and 2, the input audio signal, appearing at input conductor 10 and represented, for convenience, as a single-frequency tone in the voltage versus time plot 12, is applied to the single sideband full carrier generator 14. That generator, in the representative form disclosed, comprises a balanced modulator 16 to which both the input audio signal and a carrier-frequency signal are applied, the latter being obtained from a suitable carrier-frequency oscillator 18 (normally crystal controlled).

The suitable balanced modulator 16 of conventional form is illustrated more fully in FIG. 2. The carrier voltage is applied, via conductor 20, to the grids of a pair of matched modulated amplifiers including tubes 22 and 24, the carrier voltages at the grids of the two tubes being in phase with one another. The modulating audio signal is applied through center-tapped transformer 26 so that the modulating signal appears at the grids of tubes 22 and 24 in out-of-phase relationship. With proper amplitude and phase balancing of the generator, the carrier signal is canceled in the center-tapped primary of output transformer 28 and is therefore suppressed. Both sidebands, resulting from the amplitude-modulation, appear across the secondary of transformer 28 and hence at conductor 30.

The suppressed-carrier double sideband wave appearing at conductor 30, that is, between conductor 30 and ground, is represented in the voltage-frequency or spectrum curve 32 in FIG. 1, the carrier position being represented for clarity.

The signal at conductor 30 is passed through filter 34 to produce at conductor 36 the single sideband, suppressed carrier wave represented in the voltage-frequency curve 38. Filter 34 may be designed, in accordance with well-known techniques, to pass either the upper or the lower sideband, rejecting the other, and is representatively shown as passing the upper sideband.

The carrier-frequency voltage appearing at conductor 20 is applied (with, if necessary, amplification) through an attenuator 40, for adjusting its amplitude, and is added to the voltage at conductor 36 by apparatus 42, identified as a summation circuit. Apparatus 42 may be but a connection between the two input conductors (as illustrated in FIG. 2), a passive network in the nature, for example, of isolating resistors, or, if desired, an active but linear circuit. The output signal of summation 42 and of the single sideband full carrier generator 14, appearing at conductor 44, is represented in the voltage-frequency curve 46 and in the voltage time curve 48. It is preferred that attenuator 40 be adjusted to provide a carrier amplitude equal to or greater than the peak amplitude of the selected sideband, producing a single sideband full carrier signal at the output of generator 14, as is represented in curves 46 and 48. However, it has been found that the equipment will transmit a signal which, upon demodulation, is not excessively distorted even though the carrier amplitude at conductor 44 be as much as 20 db down from the peak sideband voltage, so that reduced carrier operation is feasible.

The phase-modulated component of the generator output voltage at conductor 44 is then isolated by means including time delay 50 and limiters 52. Time delay (or phase corrector) 50 is merely a means for adjustably equating the time delay in the branch in which it is located with that imposed in another branch, and may be generally characterized as a device having a rectilinear slope of frequency versus phase. Suitable such units are well known and commonly employed. While the unit may be located at any point in the phase-modulated component branch, the depicted positioning is advantageous. Thus, if the time delay unit 50 is placed after limiters 52, the delay unit must have a band width adequate for all components of the limited, phase-modulated signal, whereas if unit 50 is placed prior to limiters 52 in the train, its band width needs to be adequate only for the signal and carrier frequencies. Since an increase in the band width necessarily results in a decrease of the time delay, the equipment required in the latter and illustrated case can be appreciably less expensive than equipment producing the same delay but disposed after limiters 52.

Correlatively, if the equipment parameters are such that the time delay unit 50 should be disposed in the amplitude-modulated component branch, economies will again be effected if it is disposed before, rather than after, the means for demodulating the signal, in this case for the reason that equipment for effecting unit time delay of a higher-frequency signal may be appreciably simpler than equipment for effecting the same delay of a lower-frequency signal. It will be noted that, in the disclosed arrangement, a time delay unit 68 is disposed in the amplitude-modulated component branch to represent its preferred location. It is not essential, of course, that units 50 and 68 both be provided.

The delayed signal at conductor 54 is applied to limiters 52 which may be conventional clipping or saturation types. Suitable limiters are illustrated in FIG. 2. It is, of course, desirable that the transient response of the limiters be as excellent as feasible. In practice, it may in certain circumstances be desirable to use a number of limiting stages with intermediate amplification.

The output of limiters 52, appearing at conductor 56 and illustrated in the voltage-time curve 58, is a limited single-sideband wave having no or effectively no amplitude-modulated component. The limiter output is amplified by amplifier 60, producing wave form 62 at conductor 64. The requirements for the amplifier 60 are not stringent and block 60 is identified, as an illustration of that fact, as a class C amplifier. The signal appearing at conductor 64, the phase-modulated component of the single-sideband signal, is applied as one of the input signals to modulated amplifier 66.

As noted, the generator output signal appearing at conductor 44 contains both amplitude and phase modulated components, and the means for isolating the phase-modulated component have been described.

In the arrangement disclosed in the noted patent, the phase-modulated component is isolated and subsequently modulated by the full amplitude-modulated component of the single-sideband generator output. The disclosed apparatus is shown to be imbued with the capability of selectively providing a pure single-sideband output, both to illustrate the relationship of the inventions and to demonstrate that commercial equipment may be relatively simply embellished to provide this flexibility. Thus, with switch SW1 at its No. 2 position, the output of the single-sideband generator, appearing at conductor 44, is applied through time delay 68 (if such be provided) and via conductor 70 to a diode envelope demodulator 72 (FIG. 1) which may be of the type disclosed in the noted patent and is consequently not detailed in FIG. 2 hereof. Full demodulation, as produced by that unit, results in a signal at conductor 74 having a wave form as illustrated in the voltage-time curve 76. That signal corresponds to the envelope wave shape of the single-sideband wave at conductor 44 and is effectively the same (with a sinusoidal input signal to the system) as that of a full wave rectified sine wave. It is important to note that the output of the demodulator or diode detector 72 is not of the same wave form as that of the input audio signal to the system.

Signal 76 can be applied through switch SW1, conductor 104, attenuator 78, conductor 82, amplifier 84, conductor 86, modulator or power amplifier 88, conductor 90, and to modulated amplifier 66 in which the components are recombined, in the manner taught in the noted patent to reproduce the signal 48, appearing at conductor 44, in amplified form. The output signal at conductor 94 is or may be applied through the linear transmitter amplifier 96 to the antenna 98.

To practice the principles of the present invention, switch SW1 is transferred to its No. 1 position, disabling diode demodulator 72 and enabling unit 100 which is denominated a product demodulator and is also known as a heterodyne demodulator. The function of this unit is to reproduce the fundamental of the envelope of the single side band generator output signal. That fundamental will have effectively the same signal components as the audio input signal to the system, as is represented in the drawings by the identity between curves 12 and 102, the latter of which is the output voltage of unit 100, appearing at conductor 104. The expression "fundamental of the amplitude-modulated component of the single-sideband wave," and equivalent expressions used herein, means a signal having effectively the same signal components as the audio input signal to the system, and is a replica of the audio input signal as is indicated by the similarity between curves 102 and 12 in FIGURE 1 of the drawings. If signal 12 were a complex signal, signal 102 would be a corresponding complex signal and would contain effectively the same signal components as the audio input signal.

The signal 102, while bearing the above noted characteristics with respect to wave 12, tends to be shifted in phase due to the action of generator 14, and particularly as a result of the selective filtering in unit 34. With the disclosed arrangement, the phase shifting produced by filter 34 is effectively balanced or cancelled upon remodulation since that phase shift appears in both of the signals fed into modulated amplifiers 66. Consequently, the form of the system's output wave is much better than would be the case if the phase-modulated component were amplitude modulated directly with the audio frequency input signal 12. It would be possible to operate the system on that basis with acceptable results if the signal 12 were passed through an appropriate phase-correcting network, but the complexity of such a network recommends the disclosed arrangement.

The product demodulator 100 serves electronically to multiply two input signals: the single sideband and carrier wave and the carrier wave. The signal at conductor 44 is applied to the product demodulator 100 through adjustable time delay 68 (if such be provided) as well as, in the representation of FIG. 2, through cathode follower 106 to provide improved isolation. The carrier signal, at the output of carrier oscillator 18, is applied through a phase shifter 108 (a representative and conventional form of which is illustrated in FIG. 2) and via conductor 110 to the other input to the product demodulator 100. The phase shifter is provided to establish a proper phase relationship between the signals at conductors 70 and 110. An amplitude controller may also be disposed in series with phase shifter 108 if desired, although there is no critical relationship between the amplitudes of the inputs to the product demodulator.

The product demodulator may satisfactorily assume any of a number of known forms and one suitable arrangement is illustrated in FIG. 2 It will be noted that tube 112 and its associated components are connected as a pentagrid mixer, with, representatively, the single sideband and carrier signal at conductor 70 being applied to grid 114 and with the carrier being introduced at grid 116. The output, an audio frequency signal as noted, is applied through cathode follower 118 and appears at conductor 104.

The signal at conductor 104 is applied through attenuator 78, to adjust its amplitude, to conductor 82, audio frequency amplifier 84, conductor 86, modulator 88 and via conductor 90 to modulated amplifier 66. Unit 66 combines the two input signals thereto, amplitude modulating the phase-modulated component 62 with the fundamental 102 of the amplitude-modulated component to produce a compatible single sideband wave having the same phase-modulated component as the single sideband wave but with an amplitude-modulated component having effectively none of the natural, generator-produced overtones found in the conventional single sideband wave. This output signal is represented in the voltage-time curve 120 (FIG. 1). As is further illustrated in the voltage-frequency curve 122, most of the energy is in but one of the sidebands, the spurious content in the rejected lower sideband being represented to an exaggerated extent in curve 122.

The signal at conductor 94 is or may be applied through amplifier 96 and is radiated by antenna 98.

It will be appreciated that the carrier oscillator 18 in the shown system may be operated at an intermediate frequency, and that the frequency may be translated to the assigned carrier value in the modulated amplifier 66.

As noted, the signal 48 appearing at the output conductor 44 of the generator 14 contains a phase-modulated component which is effectively isolated as signal 62 appearing at conductor 64. This signal, as any phase-modulated wave, contains a series of side-frequency components produced as an incident of the phase modulation and present even though the modulating signal is, for example, a single-tone sine wave. In the teaching of the noted patent, the phase-modulated component is amplitude modulated by the full amplitude-modulated component. The latter component in turn includes amplitude-variation components which are utilized in canceling the undesired Bessel sidebands. In that arrangement, the spurious sidebands may be balanced out to a level of about 30 db or more below the level of one of two modulating tones.

Since the remodulation in the above-described basic system of the present invention is by less than the full amplitude-modulated component, it is to be expected that the level of the spurious will be somewhat higher, the reward lying in the compatibility of the output signal and in the effectively distortionless reproduction by conventional receivers.

The spurious content will be down sufficiently, even in the basic system, so that the operation will be fully satisfactory. However, various means, represented in FIGS. 3 to 8 of the drawings, are envisioned for achieving further reduction in the spurious content of the output signal. In each of those views, the modification is an addition to the basic system of FIG. 1 and only enough of the FIG. 1 elements are reproduced in FIGS. 3 to 8 to illustrate the relationship of the added elements to those FIG. 1 elements.

Since remodulation by the full amplitude-modulated component produces less spurious than remodulation by but the fundamental of the amplitude-modulated component, one approach to the reduction in spurious lies in the addition of harmonic constituents of the amplitude-modulated component preparatory to remodulation of the phase-modulated component. However, as noted, remodulation by the full amplitude-modulated component produces (with a feasible index of modulation) an incompatible signal—one which, when received by double sideband receivers, results in a seriously distorted audio output.

While all of the harmonic constituents in the amplitude-modulated component tend to contribute to decreased spurious content in the output wave but increased distortion in the envelope of the received wave, those constituents which are of a higher frequency than the pass band of the receivers will not contribute to aurally detectable distortion. Thus, if the receivers' pass band is in the order of eight-to-nine kilocycles per second, then all harmonics (including the second) of any fundamental frequencies greater than one-half of those pass band values will fall outside of the pass band.

Figure 3:
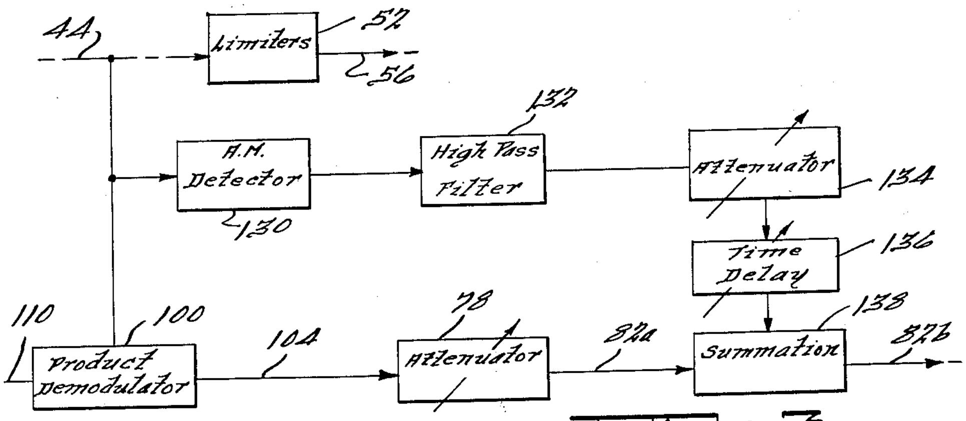
FIG. 3 is a fragmentary reproduction of the system of FIG. 1 and a representation of one added means for improving the operation of the system.

In the modification of FIG. 3, elements 130 to 138 are added to the FIG. 1 system. Element 130 is an amplitude-modulation detector, such as a diode detector, for recovering a true envelope function of the single sideband and carrier wave appearing at conductor 44. The resultant full amplitude-modulated component is applied to high pass filter 132 which passes those frequencies above a selected value (e.g., five kilocycles per second) based on the characteristics of the receiving equipment, and blocks the lower frequencies. That signal is then appropriately modified in amplitude by attenuator 134 preparatory to combination with the fundamental of the amplitude-modulated component appearing at the output of attenuator 78. The combining is performed by a passive or active (but linear) network of any suitable type. That network or summation circuit 138 is interposed in lead 82 of FIG. 1, as is connoted by the reference characters 82*a* and 82*b*, the latter of which (shown in FIG. 1 as lead 82) is connected to amplifier 84.

Time delay 136 is illustrated to represent the desirability of providing means to coordinate the phases of the two inputs to summation 138 and may, of course, be disposed wherever necessary to perform that function.

By the addition of elements 130 to 138, all frequencies in the amplitude-modulated component above the selected value will be combined with the fundamental of that component prior to the remodulation of the phase-modulated component, serving to reduce the spurious content of the output radio-frequency signal without increasing the apparent distortion in the audio output of the receivers.

Figure 4:
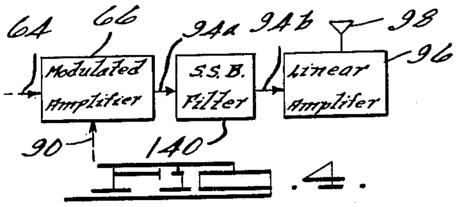
FIG. 4 is a fragmentary reproduction of the system of FIG. 1 and a representation of another added means for improving the operation of the system.

The modification illustrated in FIG. 4 of the drawings consists merely in the addition of a second single sideband filter 140 to the FIG. 1 system, filter 140 being inserted in conductor 94 (the input and output portions of which are labeled 94*a* and 94*b* in FIG. 4) and interposed the modulated amplifier 66 and the linear output amplifier 96. In this arrangement, the spurious content of the remodulated signal which falls in the band of the rejected sideband is removed from the output wave before transmission.

The previously noted side-frequency components in the phase-modulated wave (produced as an incident of the phase modulation) are considered to be in the nature of discrete, plural order sidebands the number and amplitude of which are determined by the index of modulation of the single sideband generator 14 and the character of the input wave fed to line 10. These side components can be viewed as discrete bundles of energy each capable of acting as a carrier. Consequently, amplitude modulation of the composite phase-modulated wave produces the effect of separate amplitude modulation of each of the side-frequency components of that wave. Each such amplitude modulation produces, in accepted theory, but two sidebands. Under appropriate conditions (e.g., as in the arrangement of the noted patent), these latter sidebands fully cancel the undesired constituents of the phase-modulated component.

To achieve minimum spurious in the output wave of a system such as that of FIG. 1 in which the amplitude modulation is by less than the full amplitude-modulated component of the single sideband wave, the percentage modulation should be about 67%, as can be demonstrated by an expansion of the envelope function for a perfect two-tone single sideband wave. While an index of modulation of 0.67 would produce an output wave form having a minimum spurious content, the effective output power would, of course, be substantially lower than if the index of modulation were 1.0, such as can be the case in normal double sideband wave transmission. It is desirable, therefore, to achieve a reduction in spurious from that produced by the FIG. 1 system, when operated at 100% modulation, without any reduction in the index of modulation.

Examination of the spectrum components of the phase-modulated portion 58 of the single sideband wave 48 indicates that with 100% modulation, complete spurious cancellation is not achieved primarly because the first order sidebands of the phase-modulated portion are of insufficient amplitude. This suggests that a reduction in spurious can be achieved, even though the index of modulation in the modulated amplifier 66 be high, if means be devised for, in effect, increasing the relative magnitude of those first order sidebands.

The modified arrangements of FIGS. 5 to 8 represent such means. These systems are based upon the discovery that improved results can be achieved by effectively increasing the phase modulation of the phase-modulated component 58—62. It appears that any increase, within limits, will result in an output wave of reduced spurious content, but that the best performance is achieved if the phase modulation is increased by a multiplying factor in the order of 1.1 to 1.5. The optimum value appears to be very close to 1.4, producing a phase-modulated component having a peak phase deviation of approximately 126° instead of the 90° for a two-equal-tone wave. Thus, in practical tests, it was found that a multiplication of the phase modulation index of the phase-modulated component by four-thirds allowed 100% amplitude modulation in unit 66 with the spurious content being down 23 db, while multiplication by 1.4 resulted in measured spurious rejection in the order of 28 to 30 db.

Figure 5:
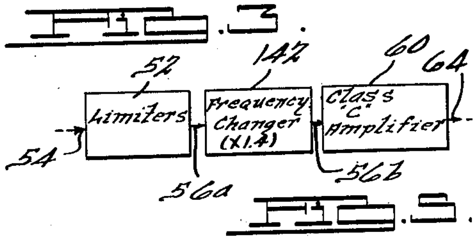
FIG. 5 is a fragmentary reproduction of the system of FIG. 1 and a representation of another added means for improving the operation of the system.

In the arrangement of FIG. 5, the alteration of the modulation index of the phase-modulated component is accomplished by frequency translation. A frequency changer 142 is inserted in lead 56 in the system of FIG. 1 (input and output leads 56*a* and 56*b* in FIG. 5), between the limiters 52 and the amplifier 60. Circuitry for producing frequency multiplication of the desired order is readily devisable, a regenerative divider being employed in one tested system. Multiplication by four-thirds (multiplying the frequency by four and dividing it by three) or, preferably, by approximately 1.4, increases the phase deviation of that phase-modulated component by the same factor.

Figure 6:
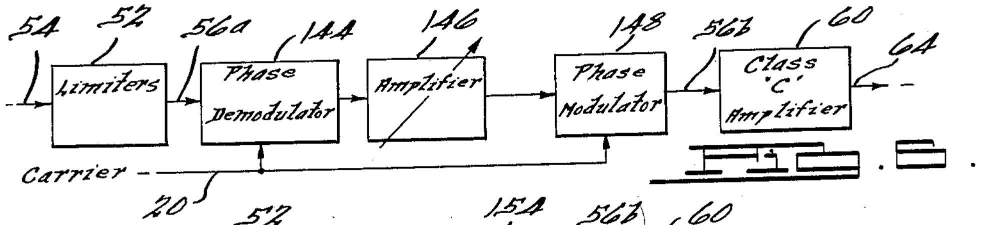
FIG. 6 is a fragmentary reproduction of the system of FIG. 1 and a representation of another added means for improving the operation of the system.

In the system disclosed in FIG. 6, the modulation index of phase modulation is increased by inserting elements 144, 146 and 148, in series, in conductor 56 (FIG. 1) between the limiters 52 and the amplifier 60. The phase-modulated component 58 appearing at conductor 56 in FIG. 1 and at conductor 56*a* in FIG. 6 is applied, in conjunction with the carrier wave at conductor 20, to a phase demodulator 144. The demodulated signal is applied through amplifier 146 and employed to remodulate the carrier at conductor 20 in a phase modulator 148, the gain of the amplifier 146 being selected to increase the resulting phase modulation by a factor of approximately 1.4.

Figure 7:
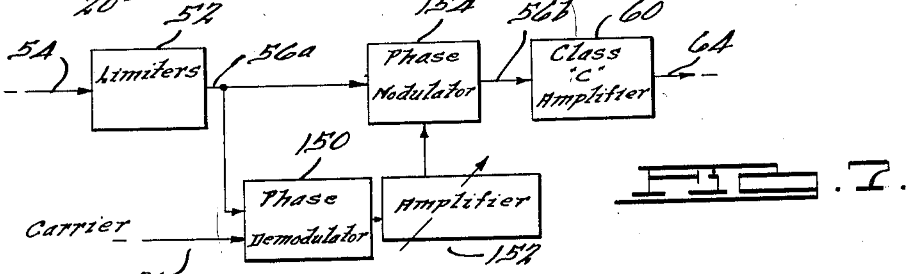
FIG. 7 is a fragmentary reproduction of the system of FIG. 1 and a representation of another added means for improving the operation of the system.

In the modification of FIG. 7, the phase-modulated component at the output of limiters 52 (at conductor 56 in FIG. 1 and at conductor **56*a* in FIG. 7) is similarly demodulated by demodulator 150, amplified in amplifier 152, and employed to modulate not the carrier as in FIG. 6 but the original phase-modulated component 58** so as to increase the phase modulation by an appropriate factor, as 1.4.

Figure 8:
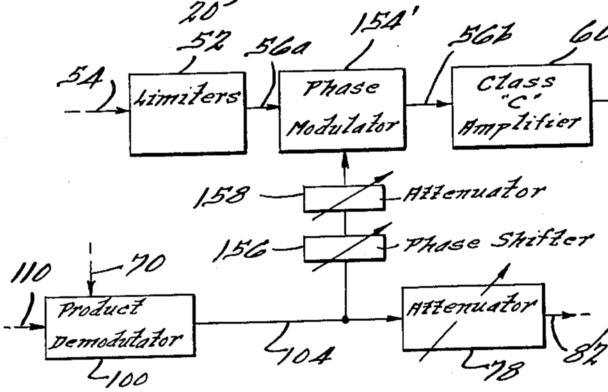
FIG. 8 is a fragmentary reproduction of the system of FIG. 1 and a representation of another added means for improving the operation of the system.

Alternatively, the phase modulation can be by but the fundamental or sinusoidal function as is illustrated in FIG. 8. In that arrangement, a portion of the output of the product demodulator 100 is adjusted in phase and amplitude by phase shifter 156 and attenuator 158 and employed to phase modulate the phase-modulated component 58, that modulation being accomplished in phase modulator 154'. Again, the index of modulation of the signal at conductor **56*b* should exceed that of the signal at conductor 56*a*** by an appropriate factor if the transmitted wave is to have improved spurious characteristics.

It will be appreciated that the foregoing arrangements are but illustrative of ways to accomplish the noted end, and that they themselves may be modified, if desired. As an example, a single sideband filter may be added to the system of FIG. 5, in the manner taught in FIG. 4, to reduce the spurious content of the final amplitude-modulated wave. As in the FIG. 4 system, this additional filtering tends to introduce distortion of the envelope, but since the energy of the spurious components eliminated by this filter is extremely low, the distortion produced by the additional filtering is very small.

It is, of course, possible, with the benefit of the present teachings, to produce a compatible single sideband wave in other ways than those representatively above-described. As one further example, it has been found, from a spectrum analysis of the compatible single sideband wave produced by the described systems, that a similar output wave form can be attained without separation of the phase-modulated component. That analysis demonstrates, for a specific example, that a wave having an envelope of substantially perfect sinusoidal shape can be produced by summing (1) a carrier having an amplitude of 0.65 volt, (2) a sideband separated from the carrier by the desired sinusoidal tone frequencies and having an amplitude of one volt, and (3) a second harmonic of that sideband having an amplitude of 0.35 volt. Therefore, a compatible single sideband signal could be produced by distorting, in a suitable distorting circuit, the output of the product demodulator (the product of the carrier times the pure single sideband and carrier wave) to produce a second harmonic wave having the proper amplitude and phase characteristics. That wave can then be employed to modulate not but the phase-modulated component as before, but rather to modulate the pure single sideband and carrier wave 48. By passing the resulting wave through a single sideband filter, the envelope of the output wave will be a close approximation to a pure sinusoidal form. Other variations will be apparent to those skilled in the art.

The principles of the invention may be applied to the concurrent transmission of two output signals, that is, to dual-channel transmission. This can be accomplished, as an example, by providing a pair of the systems illustrated in FIG. 1 through the modulated amplifier stage, summing the two modulated amplifier outputs in a linear circuit and applying the sum to a linear single sideband transmitter or to an envelope elimination and restoration-type transmitter, one form of which is the subject of my patent application Serial No. 483,357, filed January 21, 1955, now Patent No. 2,903,518. For the best operation, the frequency of the carrier oscillator 18 in one channel should differ from that in the other by more than the single sideband width. A five kilocycle per second carrier spacing is normally adequate if the same sidebands (upper or lower) are selected in both channels or if the upper sideband is selected for the higher-frequency channel, and the lower sideband for the lower channel. The noted transmitter requirements arise from the fact that if the summed signal is applied to a non-linear transmitter, the produced beat between the two carriers will be of non-sinusoidal configuration, the envelope of the separation frequency additionally containing harmonics of that frequency, resulting in audible distortion of the output of any amplitude modulation receiver having a sufficient band width to pass the harmonic components.

While it will be apparent that the embodiments of the invention herein disclosed are well calculated to fulfill the objects of the invention, it will be appreciated that the invention is susceptible to modification, variation and change without departing from the fair meaning and proper scope of the subjoined claims.

What is claimed is:

1. The method of transmitting audio-frequency information receivable either by single-sideband or double-sideband receivers which comprises generating an audio-frequency input signal, generating a single-sideband wave containing the audio-frequency information and generator-induced harmonics thereof, and separating and amplitude modulating at least a portion of the phase-modulated component of the single-sideband wave with a replica of the audio input signal containing only components present in the audio-frequency input signal.

2. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, and amplitude modulating the phase-modulated component with the isolated fundamental.

3. The method of transmitting audio-frequency information receivable either by single-sideband or double-sideband receivers which comprises generating a single-sideband-and-carrier wave containing the audio-frequency information, deriving from the single-sideband-and-carrier wave an audio-frequency signal having substantially the same spectrum components as the audio-frequency input signal, deriving from the single-sideband-and-carrier wave a single-sideband signal having substantially the same phase-modulation as the single-sideband-and-carrier wave, and amplitude modulating the derived single-sideband signal with the derived audio-frequency signal.

4. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, increasing the modulation index of phase modulation of the isolated phase-modulated component, and amplitude modulating the increased-modulated wave with the isolated fundamental.

5. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, increasing the modulation index of phase modulation of the isolated phase-modulated component to between 1.1 and 1.5 times its original value, and amplitude modulating the increased-modulated wave with the isolated fundamental.

6. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, increasing the modulation index of phase modulation of the isolated phase-modulated component to about 1.4 times its original value, and amplitude modulating the increased-modulated wave with the isolated fundamental.

7. The method of transmitting audio-frequency information receivable either by single-sideband or double-sideband receivers which comprises generating a single-sideband wave containing the audio-frequency information, isolating at least a portion of the amplitude-modulated component of the single-sideband wave, isolating the phase-modulated component of the single-sideband wave, multiplying by more than unity the frequency of the isolated phase-modulated component, and amplitude modulating the increased-frequency phase-modulated component with the isolated amplitude-modulated component.

8. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, multiplying by more than unity the frequency of the isolated phase-modulated component, and amplitude modulating the increased-frequency phase-modulated component with the isolated fundamental.

9. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, increasing the frequency of the isolated phase-modulated component to between 1.1 and 1.5 times its original value, and amplitude modulating the increased-frequency phase-modulated component with the isolated fundamental.

10. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, increasing the frequency of the isolated phase-modulated component to about 1.4 times its original value, and amplitude modulating the increased-frequency phase-modulated component with the isolated fundamental.

11. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, increasing the modulation index of phase modulation of the isolated phase-modulated component by phase modulating the isolated phase-modulated component, and amplitude modulating the increased-modulated wave with the isolated fundamental.

12. The method of transmitting audio-frequency information receivable either by single-sideband or double-sideband receivers which comprises generating a single-sideband wave containing the audio-frequency information and generator-induced harmonics thereof, isolating only the fundamental of the amplitude-modulated component of the single-sideband wave and removing the generator-induced harmonics, isolating the phase-modulated component of the single-sideband wave, phase modulating the phase-modulated component with the isolated fundamental, and amplitude modulating the phase-modulated component with the isolated fundamental.

13. A transmitter for transmitting a compatible single-sideband wave comprising means for producing an audio-frequency input signal, means for generating a single-sideband wave having amplitude- and phase-modulated components, said amplitude-modulated component including the audio-frequency input signal as a fundamental and generator-induced harmonics thereof, limiter means for producing a signal having only the phase-modulated component of said single-sideband wave, demodulator means for producing a signal derived only from the fundamental of the amplitude-modulated component by removing the generator-induced harmonics, and means for amplitude modulating the signal produced by said limiter means with the signal produced by said demodulator means.

14. A transmitter for transmitting a compatible single-sideband wave comprising means for producing a single-sideband-an-carrier wave having amplitude- and phase-modulated components, means including limiter means for deriving a signal only from the phase-modulated component of said single-sideband-and-carrier wave, means for multiplying the single-sideband-and-carrier wave by the carrier to produce the fundamental of the amplitude-modulated component, means for individually amplifying said signal and said fundamental, and means for amplitude-modulating the amplified signal with the amplified fundamental.

15. In a transmitter, generating means for producing a single-sideband wave having radio frequency amplitude- and phase-modulated components, means for isolating at least a portion of the phase-modulated component means for isolating at least a portion of said amplitude-modulated component, radio frequency time delay means interposed between said generating means and one of said isolating means, and means recombining said components.

16. A transmitter for transmitting a compatible single-sideband wave comprising generating means for producing a single-sideband-and-carrier wave having amplitude- and phase-modulated components, limiter means for producing a signal having only the phase-modulated component of said single-sideband wave, means for multiplying the single-sideband-and-carrier wave by the carrier to produce the fundamental of the amplitude-modulated component, means for individually amplifying said signal and said fundamental, time delay means interposed said generating means and said limiter means for equating the time delays to which said signal and said fundamental are subjected, and means for amplitude-modulating the amplified signal with the amplified fundamental.

17. A transmitter for transmitting a compatible single-sideband wave comprising generating means for producing a single-sideband-and-carrier wave having amplitude- and phase-modulated components, limiter means for producing a signal having only the phase-modulated component of said single-sideband wave, means for multiplying the single-sideband-and-carrier wave by the carrier to produce the fundamental of the amplitude-modulated component, means for individually amplifying said signal and said fundamental, time delay means interposed said generating means and said multiplying means for equating the time delays to which said signal and said fundamental are subjected, and means for amplitude-modulating the amplified signal with the amplified fundamental.

18. A transmitter for transmitting a compatible single-sideband wave comprising means for producing an audio-frequency input signal, means for generating a single-sideband wave having amplitude- and phase-modulated components, said amplitude-modulated component including the audio-frequency input signal as a fundamental and generator-included harmonics thereof, limiter means for producing a signal having only the phase-modulated component of said single-sideband wave, means for altering the signal produced by said limiter means by increasing the modulation index of phase modulation of said signal, demodulator means for producing a signal derived only from the fundamental of the amplitude-modulated component by removing the generator-induced harmonics, and means for amplitude modulating the altered signal with the signal produced by said demodulator means.

19. In a transmitter for transmitting a compatible single-sideband wave, a source of carrier-frequency signals, a source of audio-frequency signals, means connected to both of said sources for producing a single-sideband wave, means for adding carrier to the single-sideband wave to produce a single-sideband-and-carrier wave, means for multiplying the single-sideband-and-carrier wave times additional carrier for producing an audio-frequency wave having substantially the same spectrum components as the audio-frequency signals from said source but altered in phase therefrom by virtue of the action of said means for producing a single-sideband wave, limiter means for isolating the phase-modulated component of said single-sideband-and-carrier wave, and means for amplitude modulating said phase-modulated component with said audio-frequency wave.

20. In a transmitter for transmitting a compatible single-sideband wave, a source of carrier-frequency signals, a source of audio-frequency signals, means connected to both of said sources for producing a single-sideband wave, means for adding carrier to the single-sideband wave to produce a single-sideband-and-carrier wave, means for multiplying the single-sideband-and-carrier wave times additional carrier for producing an audio-frequency wave having substantially the same spectrum components as the audio-frequency signals from said source but altered in phase therefrom by virtue of the action of said means for producing a single-sideband wave, limiter means for isolating the phase-modulated component of said single-sideband-and-carrier wave, means for individually amplifying said phase-modulated component and said audio-frequency wave, means for amplitude modulating the amplified phase-modulated component with the amplified audio-frequency wave, and means for transmitting the resulting signal.

21. In a compatible single-sideband-and-carrier transmitter including an antenna or the like, an output device for supplying signal energy to the antenna or the like, a source of audio-frequency energy, a source of carrier-frequency energy, producing means connected to both of said sources for producing a single-sideband-and-carrier signal including harmonics which would distort the audio output of a double-sideband receiver upon detection of said signal at the receiver, and means connected serially between said producing means and said output device and responsive to said signal for suppressing said harmonics and for supplying to said output device a single-sideband-and-carrier signal which upon detection in a double-sideband receiver will produce an intelligible audio signal.

22. In a transmitter, a source of audio-frequency energy, a source of carrier-frequency energy, and means connected to both of said sources for producing a compatible single-sideband-and-carrier wave having an index of modulation greater than 0.67 and having as components, when the index of modulation is unity, a carrier, a sideband separated from the carrier by said audio frequency, and a second harmonic of said sideband in a voltage ratio in the order of 0.65:1.0:0.35.

23. In a compatible single-sideband-and-carrier transmitter including an antenna or the like, an output device for supplying signal energy to the antenna or the like, a source of audio-frequency energy, a source of carrier-frequency energy, means connected to said source of carrier-frequency energy and interposed between said source of audio-frequency energy and said output device for supplying to said output device a single-sideband-and-carrier signal derived from said audio-frequency energy and said carrier-frequency energy and having an envelope which has substantially the same spectrum components as the audio-frequency signal, all signal energy supplied to said means passing through said means but once and in a direction towards said output device.

24. Transmitting means for transmitting a compatible single-sideband wave comprising a source of audio-frequency signals, a source of carrier-frequency signals, means controlled by both of said sources for producing a single-sideband-and-carrier wave including said carrier and a first-order sideband, and means for improving the effective index of modulation and for rendering the single-sideband-and-carrier wave compatible comprising means for adding to said single-sideband-carrier wave only a second-order sideband at twice the frequency spacing from the carrier as said first-order sideband.

25. In a transmission system for supplying signals receivable either by single-sideband or double-sideband receivers without perceptible distortion of the audio intelligence of the received signal, means for generating a single-sideband wave containing the audio intelligence, means for isolating the fundamental of the amplitude-modulated component of the said single-sideband wave, means for isolating the phase-modulated component of the single-sideband wave, means for increasing the modulation index of the phase modulation of the isolated phase-modulated component to between about 1.1 and about 1.5 times its original value, and amplitude modulating the increased phase-modulated wave with said isolated fundamental to produce an output wave with an index of modulation approaching unity and having a carrier, a first-order sideband and a second-order sideband in respective voltage ratios of about 0.65:1.0:0.35.

26. The method of transmitting audio-frequency information receivable either by single-sideband or double-sideband receivers which comprises the steps of generating an audio-frequency input signal, generating from the audio-frequency input signal a single-sideband wave, isolating the phase-modulated component of the single-sideband wave, deriving a modulating audio-frequency signal containing only components present in the audio-frequency input signal, and amplitude-modulating the phase-modulated component with the modulating audio-frequency signal.

27. The method of transmitting audio frequency information for reception and detection by either single-sideband or double-sideband receiver means, comprising generating a conventional single-sideband and carrier wave and reducing the envelope distorting components of the generated wave by reconstituting such wave to have a level of modulation higher than about 0.67 and to consist essentially of a somewhat reduced carrier, the first order sideband, and a relatively smaller but substantial second order sideband.

28. The method of generating an audio signal modulated single-sideband and carrier wave with characteristic amplitude modulated and phase modulated components so as to render such compatible for reception by either single-sideband or double-sideband receiver means, comprising establishing the amplitude envelope of said single-sideband and carrier wave to have substantially the same spectrum components as said audio signal, while increasing the phase modulation of said wave in a manner so that the compatible wave at high levels of modulation consists essentially of a relatively small but substantial second-order sideband as well as the carrier and first-order sideband.

29. In a radio transmitter comprising a single-sideband generator fed by a carrier input and an audio frequency input, and means transmitting the single-sideband wave produced, the improvement rendering said single-sideband wave compatible for reception by either single-sideband or envelope detection receivers, said improvement comprising means reconstituting the envelope of said single-sideband wave to have the same spectrum components as said audio frequency input without substantial harmonic distortion, and means altering the phase modulation of the wave components in a manner providing that the reconstituted wave at high order modulation levels consists essentially of a relatively small but substantial second order sideband as well as a carrier and first-order sideband.

30. The method of transmitting audio-frequency information for reception either by single-sideband or by double-sideband receivers which comprises generating a single-sideband wave containing the audio-frequency information, separating the single-sideband wave into an at least predominantly phase modulated component and an at least predominantly amplitude modulated component, and amplifying and recombining the components to reproduce a single-sideband wave, characterized by the steps of isolating the fundamental of the amplitude modulated component of the single-sideband wave, and amplitude modulating the at least predominantly phase modulated portion of the single-sideband wave with the isolated fundamental, thereby suppressing the sideband-generator-induced harmonics which would distort the audio output of a double-sideband receiver to provide a compatible single-sideband wave.

References Cited in the file of this patent

UNITED STATES PATENTS

| | | |
|---|---|---|
| 2,048,080 | Potter | July 21, 1936 |
| 2,387,652 | Dickieson | Oct. 23, 1945 |
| 2,666,133 | Kahn | Jan. 12, 1954 |
| 2,761,105 | Crosby | Aug. 28, 1956 |
| 2,793,349 | Crosby | May 21, 1957 |
| 2,808,504 | Neumann | Oct. 1, 1957 |